United States Patent [19]

Foreman et al.

[11] Patent Number: 4,874,528
[45] Date of Patent: Oct. 17, 1989

[54] METHOD FOR TREATING DISPERSIONS OF OLEOPHILIC LIQUIDS AND WATER

[75] Inventors: Michael R. Foreman, Maurice, La.; Albert F. Hadermann, Ijamsville, Md.; Jerry C. Trippe, Fairfax Station, Va.

[73] Assignee: General Technology Applications, Inc., Manassas, Va.

[21] Appl. No.: 220,628

[22] Filed: Jul. 18, 1988

[51] Int. Cl.[4] ............................................. B01D 17/04
[52] U.S. Cl. .................................... 210/705; 210/708
[58] Field of Search .......................... 427/222; 137/13; 210/708, 705, 734, 634

[56] References Cited

U.S. PATENT DOCUMENTS

| | | | |
|---|---|---|---|
| 4,190,069 | 2/1980 | Krantz | 137/13 |
| 4,454,047 | 6/1984 | Becker et al. | 210/708 X |
| 4,720,397 | 1/1988 | O'Mara et al. | 427/222 X |

Primary Examiner—Frank Spear
Attorney, Agent, or Firm—Roland H. Shubert

[57] ABSTRACT

Dispersions of oil and similar liquids in water are clarified with separation of the oil and water phases by mixing the dispersion with a polymer dissolved in an oil miscible solvent in a manner such that contact between the polymer solution and dispersed oil droplets is achieved. The polymer must be soluble in the oil and must have a molecular weight sufficiently high to impart viscoelasticity to the resulting solution of polymer in solvent and oil. Thereafter, the oil and water phases are readily separated by settling and decantation, or by enhanced phase separation techniques such as centrifugation.

20 Claims, 1 Drawing Sheet

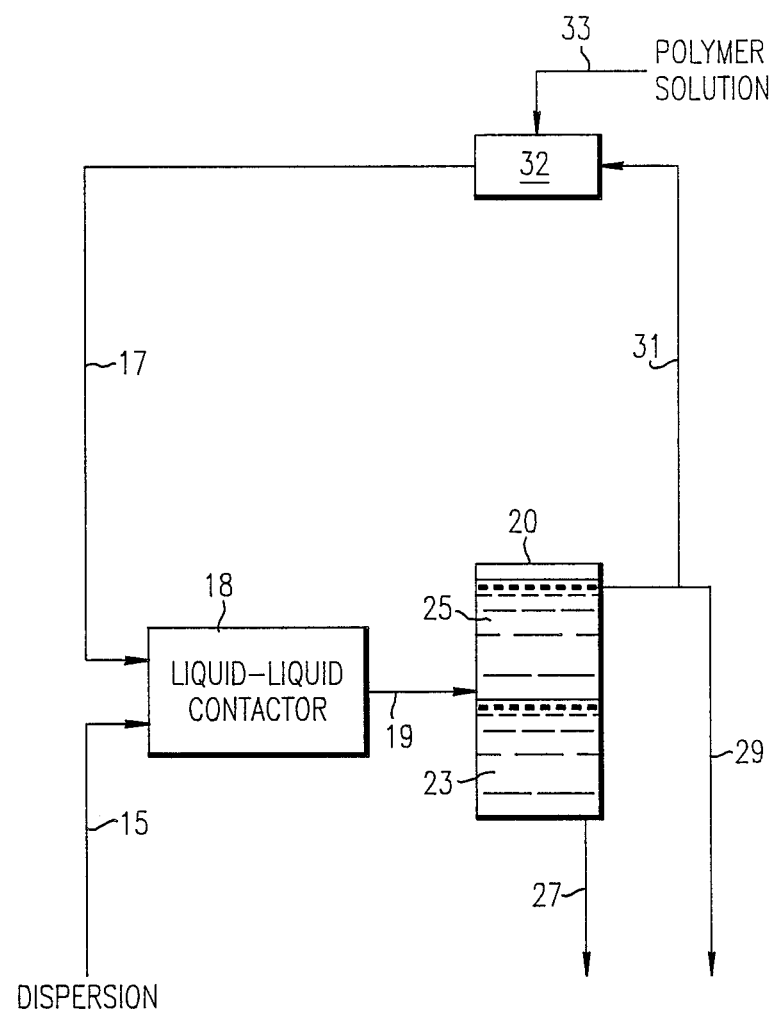

METHOD FOR TREATING DISPERSIONS OF OLEOPHILIC LIQUIDS AND WATER

BACKGROUND OF THE INVENTION

1. Field of the Invention

This invention relates to a method for treating dispersions of two or more immiscible liquids to obtain a separation of the liquids one from the others.

More specifically, this invention relates to a method for treating dispersions of oleophilic liquids, typically hydrocarbons, with water to recover the oleophilic liquid and to produce a clarified water stream.

Large volumes of waste liquids comprising dispersions of oleophilic materials with water are generated in the normal course of industry and commerce. The oleophilic materials are most commonly hydrocarbons from such sources as crude oils and refined petroleum products but may include as well halogenated hydrocarbons, animal and vegetable fats and oils and the like. Dispersions of oils and greases in water include bilge and ballast water, refinery and industrial plant wastes resulting from hydrocarbon processing and from the lubrication, cleaning and degreasing of machinery and parts. Huge volumes of water having oils dispersed therein are generated in the production of crude oil. Water is commonly produced along with crude oil and, particularly in the latter stages of a field's life, the volume of water produced often greatly exceeds that of the crude.

These waste dispersions almost always require treatment to separate the oleophilic liquid from the water, sometimes for economic reasons alone, but usually to meet the requirements for waste disposal set by law and regulations. Such laws and regulations commonly require that effluents discharged into surface waters contain less than about 40 to 50 ppm oil and be totally free of an oil film sheen. A surface sheen starts to become visible at an oil concentration of about 25 gallons per square mile.

The maximum concentration of oils and other hydrocarbons in discharged effluents allowed by regulation is usually set at levels which will protect the quality of domestic water supplies and which will not harm aquatic life. Even minute quantities of oils and greases can cause troublesome odor and taste problems in domestic water supplies and produce scum lines on water treatment facilities, swimming pools and other containers. Oil films on surface waters destroy aquatic insect life, may interfere with reaeration and photosynthesis processes, and can coat the gill membranes of fish causing suffocation. Further, the presence of hydrocarbon solvents, greases and oils can upset or otherwise harm the operation of sewage treatment plants so the discharge of oil containing wastes into sewer systems is carefully regulated.

2. Description of the Prior Art

The prior art has developed a large number of approaches for the treatment of oil and other oleophilic liquid dispersions with water. Such known treatment processes include settling either in sedimentation vessels of various sorts or in lagoons, flotation, membrane separation or ultrafiltration, emulsion breaking using a variety of chemical agents, electrical dehydration, and centrifugation using both centrifuges and hydrocyclones. The most commonly used treatment processes for high volumes of waste dispersions include settling, flotation, centrifugation and combinations of these. Each of these processes have certain disadvantages and none are totally satisfactory.

The efficiency of settling processes is greatly dependent upon the difference in specific gravity between water and the oleophilic liquid and upon the droplet size of the dispersed phase liquid. These processes work best with large droplet dispersions of a relatively light, low viscosity oleophilic liquid, such as diesel fuel for example, in water. These same processes, however, are of little value in the rectification of stable, or tight, emulsions or in the separation of dispersed liquids having similar specific gravities.

Flotation processes are commonly used to strip dispersed oil droplets from water. Both dissolved-air flotation and induced-air flotation processes are used here. In dissolved-air flotation, the aqueous stream is contacted with air at high pressure causing air to dissolve in the liquid. The pressure on the liquid is then reduced which releases air bubbles that sweep oil droplets to the liquid surface. In induced-air flotation, air is drawn into a flotation cell by action of a rotor and is dispersed into the liquid as tiny bubbles. The bubbles tend to attach to oil droplets which are then carried to the surface of the water to form a foam or froth. The froth is skimmed from the liquid surface into collection launders for removal.

Centrifugation processes using either centrifuges or hydrocyclones generally are capable of removing most dispersed oils from water to acceptably low levels. Oil removal efficiency of these devices depend primarily upon the density difference between the oil and the water. Oil removal efficiency is also affected by oil droplet size with the larger droplets being more readily separated than are smaller droplets. Process temperature is a consideration as well as it affects both density and fluid viscosities. All centrifugation processes require a relatively high energy input for adequate separation. Centrifuges require sufficient power input to develop centrifugal forces through the mechanical rotation of the fluid adequate to effect a separation of the two liquid phases. Hydrocyclones usually consist of an upper cylindrical section having a tangential feed entry and a lower conical section having a bottom apex discharge opening. Pressurized liquid is introduced tangentially into the upper cylindrical portion of the device creating a downward spiralling action developing high centrifugal forces to effect the oil-water separation.

Hydrocyclones perform best in those circumstances where the oil-water dispersion is under pressure as from a flowing oil well. Proper operation of a hydrocyclone requires a pressure drop across the unit ranging from about 5 to about 20 Bars. If the dispersion is at a lower pressure than that required to adequately drive the hydrocyclone, then pumping of the dispersion is required. Pumping tends to decrease the efficiency of hydrocyclone separations as existing oil droplets are sheared into smaller droplets as they pass through pumps, valves and piping at high velocity. This consideration limits the practical usefulness of hydrocyclones for the treatment of many oil-water dispersions.

It is evident that the prior art approaches to the clarification of dispersions of water and oleophilic liquids often present practical and economic difficulties not adequately addressed by the existing technology.

SUMMARY OF THE INVENTION

Dispersions of oleophilic liquids with water are treated by mixing the dispersion with a viscoelastic solution of a high molecular weight polymer in an oleophilic solvent at conditions whereat the polymer solution is caused to intimately contact the dispersed oleophilic liquid thereby mixing with said oleophilic liquid and rendering it viscoelastic. The mixture is then caused to separate into two phases; one an oleophilic liquid phase now containing polymer in solution, and the other a clarified water phase. The process is especially effective in the treatment of hydrocarbon dispersions in water to obtain a water stream sufficiently depleted in oil content as to allow for disposal.

Hence, it is an object of this invention to treat dispersions of oleophilic liquids with water and to recover from the treatment a clarified water stream.

A specific object of this invention is to treat dispersions of oil in water to recover the oil and to obtain a clarified water stream suitable for disposal.

Another specific object of this invention is to provide a liquid-liquid separation of oil from water produced from wells.

Other objects of this invention will become apparent from the following description of preferred embodiments.

BRIEF DESCRIPTION OF THE DRAWING

Certain exemplary embodiments of the invention are illustrated in the drawing in which the sole FIGURE depicts a schematic flow sheet for the treatment of oil-water dispersions according to the teachings of this invention.

DESCRIPTION AND DISCUSSION OF THE INVENTION

This invention comprises a process for the treatment of dispersions of oleophilic liquids with water to resolve the dispersion into its components. For the purposes of this disclosure, a dispersion is considered to comprise a physical admixture of two or more immisible liquids, one of which is water, and includes but is not limited to those admixtures commonly referred to as emulsions. Water will ordinarily constitute the continuous phase.

The process is carried out by mixing a viscoelastic polymer solution with the dispersion in a manner whereby there is achieved contact between the polymer solution and the dispersed oleophilic liquid. It is necessary that the solvent used in preparing the polymer solution be miscible with the dispersed oleophilic liquid and that the polymer used to impart viscoelasticity to the solution be soluble as well in the dispersed oleophilic liquid. A viscoelastic liquid resists shearing into smaller droplets and tends to agglomerate into larger and larger globules even during rather intense agitation. As the polymer solution contacts dispersed droplets of the oleophilic liquid, the droplets are rendered viscoelastic by polymer molecules dissolving therein. Thereafter, the droplets of the oleophilic liquid also display those same viscoelastic properties, resisting shearing and tending to further agglomerate.

Polymers suitable for preparing the viscoelastic solutions used in this invention include those relatively high molecular weight thermoplastic polymers which impart a significant degree of viscoelasticity to a solvent at relatively low concentrations. Exemplary polymers useful for preparing the polymer solutions needed for practice of this invention include polyisobutylene, polyisoprene, polyalphaolefins, polybutadiene, copolymers of styrene and butadiene, copolymers of ethylene and butenes, fluoroelastomers, such as copolymers of vinylidene fluoride and hexafluoropropylene and other polymers of a generally similar nature. Particularly preferred polymers comprise that group of rubbery, thermoplastic polymers having a molecular weight in excess of 2.5 million and including polyisobutylene, polybutadiene, polyalpholefins, polyisoprene and copolymers of styrene and butadiene. It is necessary that the polymer, or polymers, used be of high molecular weight, that is, have a molecular weight sufficiently high to impart a useful degree of viscoelasticity to a solution at relatively low concentrations. Generally speaking, that will require a polymer molecular weight of more than about two and one half million. The degree of viscoelasticity imparted to a solution by polymer dissolved therein is an exponential function of the polymer molecular weight so polymer effectiveness increases sharply as the polymer molecular weight increases.

Polymer solutions may be prepared in any way that does not degrade the polymer and significantly decrease its average molecular weight through chain breakage. That requirement rules out the use of heat and anything but the most mild form of agitation. Dissolution of polymers in solvents without significant polymer degradation may readily be accomplished through use of the cryogenic dissolving process set out in the Weitzen U.S. Pat. No. 4,340,076. Polymer solutions may also be conveniently prepared by use of those specially formulated, rapid dissolving, polymer compositions set out in U.S. Pat. No. 4,720,397, incorporated by reference herein, and this last method of polymer solution preparation is preferred.

Turning now to the Figure, there is depicted a process flowsheet of a preferred embodiment of this invention. An oleophilic liquid and water dispersion, for example, oil field produced water having crude oil dispersed therein, is supplied to a liquid-liquid contactor 18 by way of line 15. Contactor 18 serves to provide intimate contact between the liquid dispersion supplied to the contactor through line 15 and a second liquid stream supplied to the contactor by way of line 17. The second liquid comprises a polymer dissolved in a solvent which is miscible with the dispersed oleophilic liquid and is essentially insoluble in water. During the contacting treatment, dispersed oil droplets are rendered viscoelastic as polymer molecules dissolve therein upon contacting the second liquid. After treatment in contactor 18, the now merged liquid streams are passed by way of conduit 19 to phase separation means 20 which serves to separate the incoming liquid into a heavy phase 23 and a light phase 25. Heavy phase 23 comprises clarified water which is discharged from separator 20 by way of line 27 for disposal, reuse or further treatment.

The light phase 25 comprises a mixture of the viscoelastic liquid supplied to contactor 18 and the oil or other oleophilic liquid contained in the dispersion and extracted by the viscoelastic liquid. Oil phase 25 is discharged from separating means 20 through conduit 29 for marketing or for further processing. Because the oil in light phase 25 is viscoelastic, it is usually advantageous to recycle at least a portion back to the liquid-liquid contacting means 18. Recycle may be accomplished by pulling a side stream 31 from discharge line 29 and passing that side stream to mixer 32 where it is blended with additional dissolved polymer introduced into mixer 32 through line 33. Mixer 32 discharges into line 17 which feeds the polymer solution to contactor 18. The amount of polymer solution added through line 33 is adjusted to make up for losses due to dilution from the oil recovered from the dispersion stream 15 and for decreases in viscoelasticity due to polymer degredation caused by agitation and shear.

The process of this invention is in some ways analogous to solvent extraction or other liquid-liquid extraction techniques. Much of the same equipment widely used in the chemical process industry for washing, neutralization, and similar unit operations may be advantageously used to carry out the process of this invention. For example, simple agitated vessels may be used to accomplish the mixing and dispersion functions of contactor means 18. Inline, or static, mixers may also be used for this purpose. Other types of liquid-liquid mass transfer apparatus, such as those providing a very large surface area for contact of one liquid with a second immiscible liquid, may be used to advantage as well. This latter type of apparatus is illustrated in U.S. Pat. Nos. 3,977,829 and 3,992,156 which employ as a liquid-liquid contacting member fibers disposed within and extending linearly along a conduit.

In all of those cases, phase separation means 20 may be a simple decanting vessel or a parallel plate separator or it may provide for accelerated or enhanced phase separation. Enhanced phase separation may include such techniques as centrifugation using hydrocyclones, for example, or flotation. Any of a variety of single or multi-stage mixer-settlers may be used for the liquid-liquid contactor means 18 and the phase separation means 20. For example, when an inline, or static, mixer is used as contactor means 18 the phase separation means 20 may be a simple decanting vessel or a plate separator or it may provide for accelerated phase separation. Likewise, other liquid-liquid mass transfer devices may be used as contactor 18 in combination with decanting, flotation or centrifugation means to achieve the necessary phase separation.

The polymer concentration in line 17 leading to the liquid-liquid contactor 18 must be sufficient to render the oil contained in dispersion 15 viscoelastic after merger therewith as a result of the contacting step. Viscoelasticity is a function of a number of different variables, principally the molecular weight of the dissolved polymer, the viscosity of the liquid in which the polymer is dissolved, and the concentration of the polymer therein. The concentration of the polymer in the merged oleophilic liquid, removed from the contactor 18 by way of line 19 and forming light phase 25 in separation means 20, depends also upon the ratio of volumes of stream 17 to the oil fraction of dispersion 15. The degree of viscoelasticity which must be imparted to the oil fraction of dispersion 15 in order for the process to properly function depends also upon the type of contactor 18 used in the process. Resistance to breakup of oil droplets upon exposure to agitation or shear increases rapidly as the viscosity of the oil increases. Generally speaking, the higher the degree of agitation employed in the contactor 18 the greater will be the degree of viscoelasticity required to obtain the same level of oil removal from the dispersion. For example, use of a propeller type of mixer in contactor 18 will ordinarily require a higher degree of viscoelasticity in the oil fraction to obtain the same result as would use of a low shear mass transfer apparatus.

Consequently, it is not possible to fix with a great deal of precision the limits of polymer concentration in the polymer solution 17 entering contactor 18. It is possible, however, to set practical guidelines appropriate for use in particular systems. Thus, in a practical sense, the concentration of the polymer solution 17 should be relatively high relative to the oil phase 29 recovered from the process but the concentration should also be low enough to ensure that the polymer solution has a low viscosity for efficient liquid-liquid contact. In general, the level of viscoelasticity in the oil phase 25 necessary for efficient process operation will require a polymer concentration above about 20 ppm. No particular advantage has been seen in providing polymer concentrations in the recovered oil phase above about 1,000 ppm. In view of these considerations, a practical range of polymer concentrations in solution 17 may be from about 100 ppm to about 10,000 ppm.

The volume ratio of polymer solution to oil-water dispersion may also vary over a wide range. The minimum polymer to oil-water volume ratio required to effectively carry out the inventive process depends upon a number of process variables. These variables include the liquid-liquid contacting method employed, the length of time that the polymer solution and the oil-water dispersion are in contact one with the other, the characteristics of the oil-water dispersion, and the characteristics of the polymer solution. In most applications, the minimum polymer to oil-water dispersion ratio will be about 1 to 100 in order to obtain adequate process efficiency although in one specific embodiment of the invention, that of treating ballast and bilge waters, the minimum ratio may be far smaller than that. Little advantage is ordinarily gained in exceeding a polymer solution to oil-water dispersion ratio of 1 to 1. A preferred volume ratio for use in most process embodiments will range from about 1 to 50 to about 1 to 5.

As was mentioned previously, one specific embodiment of this invention is in the treatment of ballast and bilge waters. An oil tanker, after off-loading cargo, will partially fill its cargo tanks with water to provide stability during its return trip. That ballast water is ordinarily pumped to a shore installation at the loading terminal to be cleaned of oil and then discarded. In the ballast water treatment embodiment of this invention, a quantity of polymer solution is introduced into each cargo tank after off-loading the oil and preferably before any significant amount of ballast water is pumped into the tank. The polymer solution will dissolve in the heel of oil left in the tank and coating the tank walls rendering that oil viscoelastic. That viscoelastic oil will tend to form a layer floating atop the ballast water and will resist dispersion into the water phase by the agitation provided by ship movement. Consequently, the ballast water is maintained essentially free of dispersed oil and, in some cases, may even be discharged directly into harbor waters without the necessity for treatment to remove oil. The amount of polymer solution added to each cargo tank must be sufficient to impart viscoelasticity to all of the residual oil contained in the tank. Ordinarily, that will require a polymer concentration in the residual oil of at least about 20 parts per million.

The following examples will serve to more fully illustrate certain embodiments of the invention.

EXAMPLE 1

A dispersion of crude oil in water taken from a producing oil well was placed into a container. A lesser amount of a polymer solution comprising polyisobutylene dissolved in an isoparaffinic solvent was then placed into the container and the contents were shaken. The contents of the container were then allowed to settle for a few minutes. From visual inspection, it was readily apparent that the dispersion had been clarified with removal of the oil from the water phase into the polymer solution.

EXAMPLE 2

Waste waters from an oil refinery were passed to a skimming pond where all separated and floating oil was removed. The oil passing out of the skimming pond normally carried about 190 ppm of oil dispersed in the water. A powdered, rapid dissolving polymer composition comprising polyisobutylene having a molecular weight of about 6 million, made by the process described in U.S. Pat. No. 4,720,397, was sprinkled on the floating oil upstream of the skimming pond in an amount calculated to produce a polymer concentration in the oil of about 500 ppm. The polymer rapidly dissolved in the oil. Between the location at which the polymer was added and the skimming pond there were two short drops, or falls, which provided thorough mixing between the floating oil and the main body of flowing water. Water passing from the skimming pond after polymer addition showed less than 20 ppm of dispersed oil remaining in the water.

EXAMPLE 3

A series of separation tests were run on a manufactured dispersion of a heavy oil in water. The dispersion was created using a homogenizer designed for the manufacture of emulsions. The homogenizer was inserted into a container into which a quantity of tap water was added. The homogenizer was then operated at maximum speed while a heavy gear oil was slowly added in an amount sufficient to give an oil concentration of 1,000 ppm in the water. Operation of the homogenizer was continued for two minutes after oil addition was complete. The resulting dispersion was cloudy in appearance and was non-settling.

Separate portions of the dispersion were taken for testing to determine the effectiveness of polymer solutions to rectify the dispersion and to recover the contained oil. Polyisobutlyene having a molecular weight of about 6 million was dissolved in an isoparaffinic solvent to form solutions containing 500, 1,000, 2,000, 5,000 and 10,000 ppm of polymer. Each solution was added to a portion of the dispersion, held in a beaker, in a volume ratio of 1 part solution to 50 parts dispersion and the liquids were mixed using a paddle mixer operating at about 600 rpm. After mixing, each sample was allowed to settle or clear undisturbed for 15 minutes. Thereafter, a sample of the water phase was taken from near the bottom of each beaker for analysis to determine the concentration of residual dispersed oil. The analytical procedure used involved extraction of hydrocarbons from the water phase using carbon tetrachloride followed by a spectrographic analysis of the extract. The following results were obtained.

TABLE

| Sample Number | Concentration of Polymer Solution (ppm) | Residual Oil in Water Phase (ppm) | Oil Removal (%) |
| --- | --- | --- | --- |
| 1 | 500 | 46 | 95.4 |
| 2 | 1,000 | 44 | 95.6 |
| 3 | 2,000 | 35 | 96.5 |
| 4 | 5,000 | 23 | 97.7 |
| 5 | 10,000 | 14 | 98.7 |

As may be seen from the tabulated results, substantial removal of dispersed oil from the water phase was accomplished at all tested levels of polymer solution concentration. The amount of dispersed oil remaining in the water phase did decrease slightly as the concentration of polyisobutylene in the polymer solution increased. It was also observed that the concentration of the polymer solution, 10,000 ppm, used to treat Sample No. 5 represents about the practical maximum for this particular solvent-polymer system as the solution was quite viscous and did not mix well with the oil-water dispersion.

The foregoing disclosure and description are for the purpose of illustrating and explaining the invention and various changes in the process variables may be made without departing from the spirit of the invention. The data and observations presented in the disclosure and in the examples are not to be construed as limiting the scope of the inventive process.

We claim:

1. A method for treating a dispersion of an oleophilic liquid in water to obtain separation of the oleophilic liquid from the water phase comprising:
   forming a solution of a polymer in a solvent, said polymer being soluble in said oleophilic liquid and having a molecular weight sufficient to impart viscoelastic properties to said solution, said solvent being miscible with said oleophilic liquid;
   contacting said dispersion with said polymer solution to dissolve polymer molecules in the oleophilic droplets of said dispersion thereby rendering said droplets viscoelastic and promoting their agglomeration with said solution; and
   separating said polymer solution, now containing oleophilic liquid, from the water phase.

2. The method of claim 1 wherein said dispersion is an oil- water dispersion.

3. The method of claim 2 wherein the volume ratio of said polymer solution to said dispersion ranges between 1 to 100 and 1 to 1.

4. The method of claim 2 wherein the concentration of polymer in said solution ranges between 100 and 10,000 ppm.

5. The method of claim 2 wherein said polymer is a rubbery thermoplastic polymer having a molecular weight greater than 2.5 million.

6. The method of claim 5 wherein said rubbery thermoplastic polymer is selected from the group consisting of polyisobutylene, polybutadiene, polyalphaolephins, polyisoprene, and copolymers of styrene and butadiene.

7. The method of claim 2 wherein said contacting is carried out in an agitated vessel.

8. The method of claim 2 wherein said contacting is carried out in a static mixer.

9. The method of claim 2 wherein said contacting is carried out in a liquid-liquid mass transfer device.

10. The method of claim 2 wherein polymer solution is separated from the water phase by decantation.

11. The method of claim 2 wherein polymer solution is separated from the water phase by centrifugation.

12. The method of claim 2 wherein polymer solution is separated from the water phase by flotation.

13. The method of claim 2 wherein a portion of the oil-containing polymer solution separated from said water phase is recycled back to the contacting step.

14. The method of claim 2 wherein said oil-water dispersion is ship ballast or bilge water and wherein said contacting comprises agitation provided by ship movement.

15. A method for the treatment of oil tanker ballast water to separate residual oil therefrom comprising:

introducing a quantity of polymer solution into the cargo compartments of said tanker after off-loading the oil transported therein, said polymer solution comprising an oil soluble polymer having a molecular weight sufficient to impart viscoelastic properties to said solution;

introducing ballast water into said cargo compartments;

maintaining said polymer solution in contact with said ballast water until said ballast water is discharged from the tanker, and separating said polymer solution from said discharged ballast water.

16. The method of claim 15 wherein the quantity and concentration of said polymer solution are selected to provide a polymer concentration greater than about 20 ppm in that residual oil remaining in said compartments after off-loading.

17. A method for clarifying an oil-water dispersion which comprises contacting said dispersion with a solution of a polymer in a hydrocarbon solvent, said polymer being soluble in said oil and having a molecular weight greater than 2.5 million, and thereafter separating said solution, now containing oil, from the residual water.

18. The method of claim 17 wherein said polymer is polyisobutylene and wherein the concentration of polymer in said solution is in the range of 100 to 10,000 ppm.

19. The method of claim 17 wherein the volume ratio of said polymer solution to said dispersion ranges between 1 to 100 and 1 to 1.

20. The method of claim 17 wherein said dispersion is an oil well fluid.

* * * * *